(12) United States Patent
Naftel

(10) Patent No.: US 8,676,809 B1
(45) Date of Patent: Mar. 18, 2014

(54) METHOD AND APPARATUS FOR MAPPING VIRTUAL MACHINE INCREMENTAL IMAGES

(75) Inventor: Timothy Michael Naftel, Longmont, CO (US)

(73) Assignee: Symantec Corporation, Mountain View, CA (US)

( * ) Notice: Subject to any disclaimer, the term of this patent is extended or adjusted under 35 U.S.C. 154(b) by 1078 days.

(21) Appl. No.: 12/165,070

(22) Filed: Jun. 30, 2008

(51) Int. Cl.
G06F 7/00 (2006.01)
G06F 17/30 (2006.01)

(52) U.S. Cl.
USPC ............................ 707/746; 707/749; 707/785

(58) Field of Classification Search
USPC .......................... 707/640, 644, 646, 649, 685
See application file for complete search history.

(56) References Cited

U.S. PATENT DOCUMENTS

| | | | | |
|---|---|---|---|---|
| 5,835,953 A * | 11/1998 | Ohran | ........................... | 711/162 |
| 7,043,485 B2 * | 5/2006 | Manley et al. | ................ | 707/658 |
| 7,287,045 B2 * | 10/2007 | Saika et al. | ........................... | 1/1 |
| 7,287,249 B2 * | 10/2007 | Coyle et al. | .................... | 717/168 |
| 7,370,164 B1 * | 5/2008 | Nagarkar et al. | ............. | 711/162 |
| 7,398,285 B2 * | 7/2008 | Kisley | ................... | 1/1 |
| 7,529,782 B2 * | 5/2009 | Prahlad et al. | ........................ | 1/1 |
| 7,596,713 B2 * | 9/2009 | Mani-Meitav et al. | ........... | 714/6 |
| 7,707,185 B1 * | 4/2010 | Czezatke et al. | ............. | 707/649 |
| 7,761,456 B1 * | 7/2010 | Cram et al. | ................... | 707/754 |
| 7,797,507 B2 * | 9/2010 | Tago | ............................ | 711/203 |
| 2003/0182253 A1 * | 9/2003 | Chen et al. | ........................ | 707/1 |
| 2003/0182301 A1 * | 9/2003 | Patterson et al. | ............. | 707/102 |
| 2005/0216788 A1 * | 9/2005 | Mani-Meitav et al. | ........... | 714/6 |
| 2006/0026218 A1 * | 2/2006 | Urmston | ...................... | 707/204 |
| 2006/0174300 A1 * | 8/2006 | Gu et al. | ....................... | 725/100 |
| 2007/0185940 A1 * | 8/2007 | Prahlad et al. | ............. | 707/204 |
| 2008/0059541 A1 * | 3/2008 | Fachan et al. | ................ | 707/204 |
| 2008/0183773 A1 * | 7/2008 | Choy | ............................ | 707/204 |
| 2009/0043977 A1 * | 2/2009 | Kamay et al. | ................. | 711/162 |
| 2009/0055607 A1 * | 2/2009 | Schack et al. | ................. | 711/162 |

* cited by examiner

Primary Examiner — Jeffrey A Burke
(74) Attorney, Agent, or Firm — Campbell Stephenson LLP

(57) ABSTRACT

Embodiments of the present invention include a method and apparatus for performing incremental mapping of virtual machine incremental images. The method and apparatus comprise creating a map of the base file as well as the incremental file, utilizing at least a portion of the file tables contained in the various images. This map indicates the type of change (i.e., whether the file is contained completely in an incremental image, is contained in the base image, or is contained in both). In another embodiment, the map may also contain the location of the change or the location of the file within the sequentially stored images upon the backup media.

12 Claims, 3 Drawing Sheets

METHOD AND APPARATUS FOR MAPPING VIRTUAL MACHINE INCREMENTAL IMAGES

BACKGROUND OF THE INVENTION

1. Field of the Invention

Embodiments of the present invention generally relate to virtual machine operation. More particularly, embodiments of the present invention relate to a method and apparatus for mapping virtual machine incremental images.

2. Description of the Related Art

When launching a virtual machine, the virtual machine software establishes at least one virtual volume that extends over one or more physical disks. The virtual volume is loaded with a virtual machine operating system such that the volume containing the operating system becomes a virtual machine. As the virtual machine operates, the information (i.e., data and applications) stored within the memory of the virtual volume is backed up periodically to memory. The memory used for the backup is generally remote from the computer supporting the virtual machine. In many instances, the backup memory is a serial device such as a tape drive.

Within the virtual volume, the initial set of applications and data are stored as a base image that reflects the starting point of the computing environment within the virtual volume. Subsequent changes to the virtual volume are stored in the base, differencing, or snapshot hard disk image. When a differencing or snapshot hard image is created, it is linked back to a previous base, differencing, or snapshot. This structure creates a linked list of virtual disk images. Each link in the list provide a point in time representation of the virtual hard drive. Modification to the virtual volume are always written to the last node in the list. This reflects the changes that occur in the data and applications and other attributes of the within the file system, as well as file additions and deletions.

Occasionally, the base image as well as the incremental images that form a set of images reflecting the content of the virtual volume at a specific point in time, are backed up to a virtual volume backup. When using a tape drive as the backup media, the backup set (the base image and its associated incremental images) is stored as a serial data stream upon the media.

If a particular file is to be restored to the virtual volume from either the back up or the images prior to backup, the restoration software must access the base image as well as all the incremental images reflected in the point in time that the restoration is to occur. As such, the entire file set (base and incrementals) that occurred prior to that point at which the restoration is to be accomplished must be restored to the virtual volume to find a complete file to be restored.

If the file is being restored from the backup media where the files are stored on the backup media sequentially, there is no ability for random access to those files. Thus, all the files in a set must be restored to be able to access the file of interest. More importantly, a given file may be spread across a base image as well as a plurality of incremental images such that the base image must be updated with the incremental images of that particular file to create the file as it existed at the time that the restoration is to be completed. Such a restoration process is time-consuming.

Therefore, there is a need in the art for a method and apparatus for mapping virtual machine incremental images.

SUMMARY OF THE INVENTION

Embodiments of the present invention comprise a method and apparatus for mapping virtual machine incremental images by creating a map of the base image as well as the incremental image(s) through utilization of file tables contained in the various images. This map indicates the type of change (i.e., whether the file is contained completely in an incremental image or is contained in both). The map, in the form of a catalog, may also contain the location of the change or the location of the file within the sequentially stored images upon the backup media.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
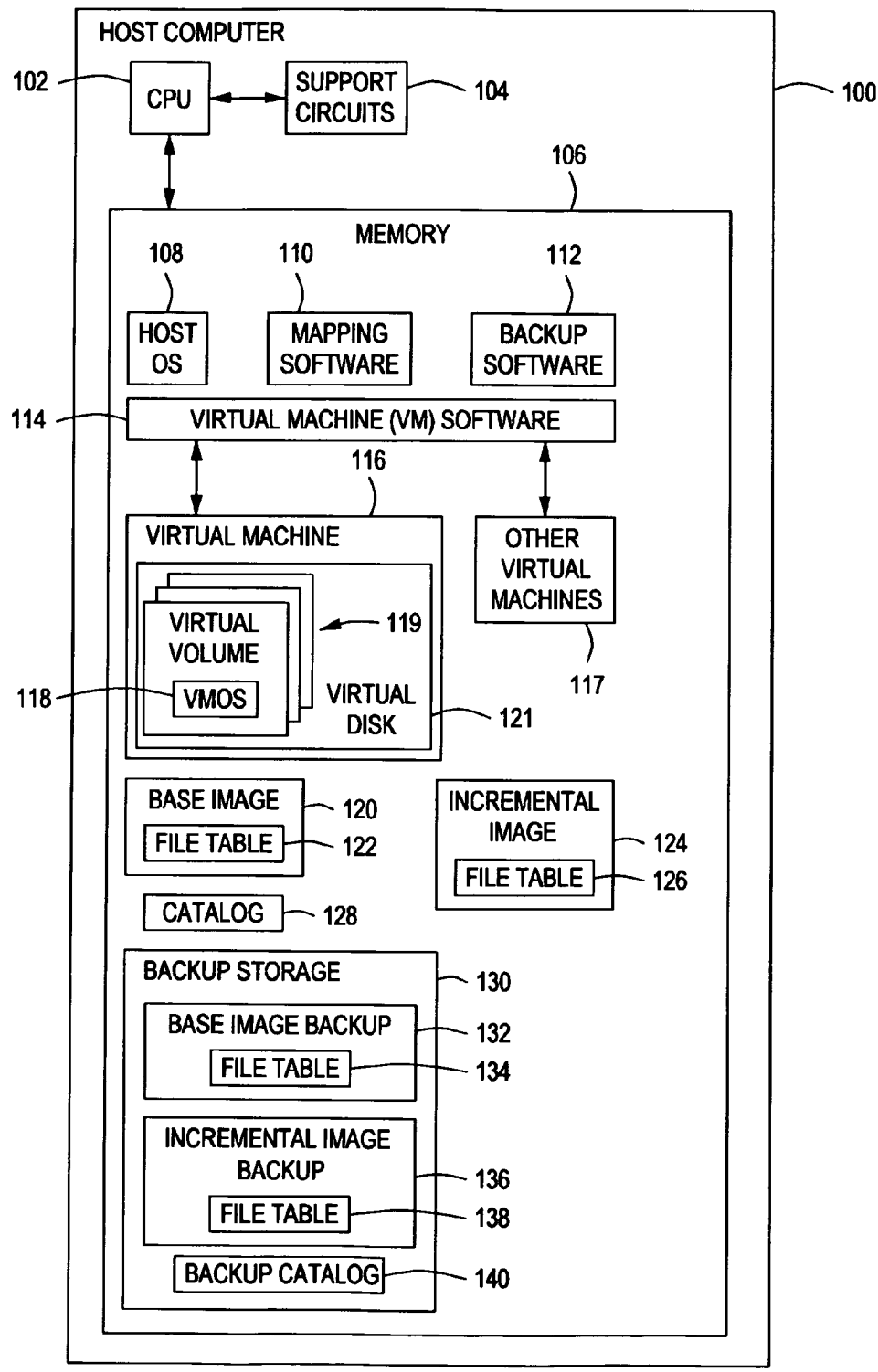
FIG. 1 depicts a block diagram of a host computer utilizing embodiments of the present invention for mapping virtual machine incremental images in accordance with one embodiment of the invention.

FIG. 1 depicts a host computer 100 supporting at least one virtual machine that can utilize embodiments of the present invention. The host computer 100 comprises a central processing unit (CPU) 102, support circuits 104, and memory 106.

The CPU 102 may comprise one or more commercially available processors, microprocessors, microcontrollers, or combinations thereof. The support circuits 104 facilitate operation of the CPU 102. The support circuits 104 may comprise such circuits and devices as clock circuits, cache, network interface cards, a communication bus, power supplies, and the like.

The memory 106 may comprise at least one of magnetic memory, semiconductor memory, optical memory, and the like. Although, the memory 116 is represented as a single block, the memory may comprise a plurality of devices such as disk drives, tape drives, RAM. ROM, and the like. The memory 106 stores a host operating system 108, mapping software 110, backup software 112, and virtual machine software 114. Additionally, as discussed below, the memory 106 stores at least one virtual disks. Additionally, the memory 106 stores a base image, an incremental image 124 and a catalog 128, as described further below. In some embodiments, a portion of memory 116 may be allocated for backup storage 130. The backup storage 130 may be remotely located or locally located.

The host operating system 108 comprises any operating system that is capable of supporting virtual machine operation. The mapping software 110 and backup software are described below with respect to FIGS. 2 and 3, respectively.

When executed, the virtual machine software 114 creates at least one virtual machine 116 that is supported by at least one virtual disk 121. The virtual disk drives support at least one virtual volume 119. The virtual machines are instantiated after a virtual volume 116 is created that contains a virtual machine operating system 118. The virtual machine software 114 may support a plurality of virtual machines 117

The memory 106 stores a number of images related to the virtual volumes. A base image 120 is formed from a copy of a virtual disk or volume at a point just after initial installation of the virtual machine operating system 118. In one embodiment, this base image may be a "golden image" of standard software used to initialize a plurality of virtual machines 116, 117.

As mentioned above, the base image 120 forms an image of the virtual volume as it exists at the launch of the virtual machine operating system. The base image 120 contains a file table 122 that identifies the files within the base image and their locations and attributes. Depending on the operating system, this file table may be Master File Table (MFT), File Attribute Table (FAT), inodes, or some other file identification table.

The incremental image 124 comprises changes that have occurred to the base image 120, subsequent to the virtual machine being instantiated. The incremental image 124 also contains a file table 126 that identifies file information and attributes of the files that are contained in the incremental image 124. Although one incremental image 124 is depicted, a plurality of incremental images may be periodically produced and stored in memory 116. Each incremental image contains a portion of the file system table that represent the files that may have changed. Because of the granularity of the virtual hard disk, a block within the incremental image may contain, for example, 64 file entries, but only 1 entry has been modified. A comparison of all the entries in the previous versions' is necessary to isolate the exact entry that has changes.

The catalog 128 is created using the mapping software 110 as described below with reference to FIG. 2. The catalog 128 comprises information about the base image 120, the incremental image 124 and their content. The catalog 128 specifically identifies each file and attributes about the file including whether the file is fully contained in an incremental image 124 or spread across both the incremental and base images.

Although generating a catalog 128 for base and incremental images 120 and 124 forms one embodiment of the invention, another embodiment of the invention creates a catalog with respect to a backup of the base and incremental images 120, 124. The backup catalog 140 may contain slightly different information compared to the catalog 128. Using the backup software 112, the images of the virtual volume 119 may be periodically backed up to form a virtual volume backup 130. The backup images comprise a base image backup 132 and its file table 134, an incremental image backup 136 and its file table 138, and a backup catalog 140. The base image backup and the incremental backup are generally copies of the base image 120 and the incremental image 124. If the base image 120 is utilized by a plurality of virtual machines 116, 117 as an instantiation image, a backup of the base image needs only to be produced once for all the virtual machines using that base image. Thereafter, incremental images for each virtual machine are backed up.

The backup catalog 140 may not be the same as the catalog 128 depending upon the type of backup media utilized. If the backup media is sequential, such as a tape drive, the backup catalog 140 contains information regarding the offset of the backup base image 132 and backup incremental images 136 relating to the media such that the beginning of the backup base image and backup incremental images can be identified on the media to extract files directly from those backup images. The backup catalog 140 contains information regarding the attributes of the files with respect to whether those files are contained completely in the backup incremental image or a combination of both. If the file is contained solely within a backup incremental image, the backup catalog identifies which incremental image backup the file is contained within.

Through using the catalog to determine whether a file is contained solely within an incremental image or within both the incremental and base images, a restoration function can quickly access a file when it is solely contained within the incremental image. When a file is spread across the base file and one or more incremental images a conventional process is used to combine the base and incremental portions of the file. The information regarding whether the file is solely contained in an incremental file significantly improves the speed of a restoration process. Additionally, the backup of a base image only once also saves backup time and storage space.

Figure 2:
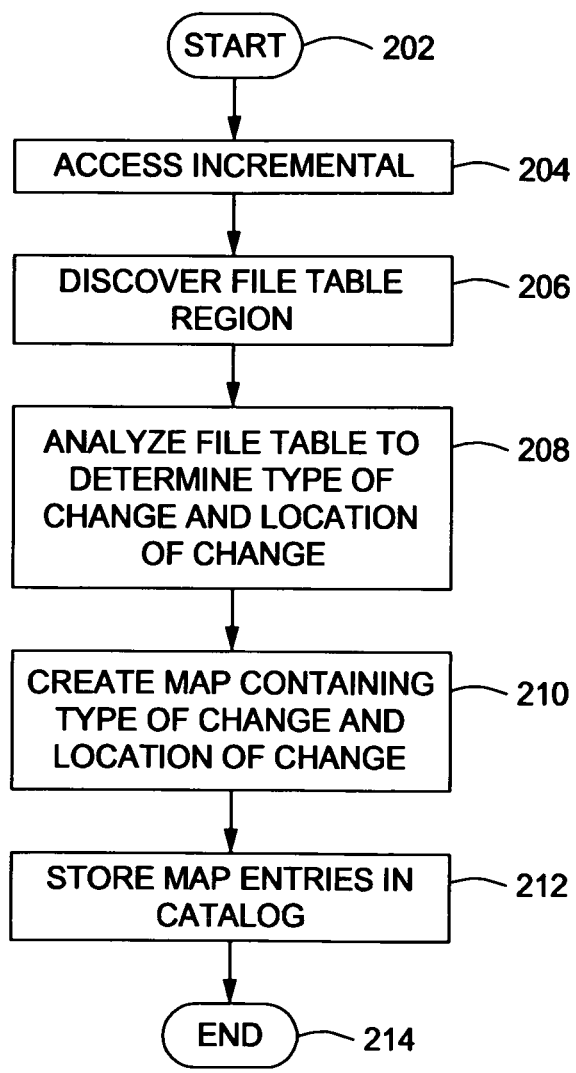
FIG. 2 depicts a flow diagram of a method for creating a catalog for base and incremental images within a virtual machine in accordance with one embodiment of the invention.

FIG. 2 depicts a flow diagram of a method 200 for creating a catalog 128 for incremental and base images of a virtual machine. The method 200 begins at step 202 and proceeds to step 204.

At step 204, the method 200 accesses the incremental image. At step 206, the method 200 discovers the file table region (also known as the file table zone) within the incremental image. Generally, the file tables are stored within a specific region within the image such that the table can be easily identified. At step 208, the method 200 analyzes at least one portion of the file table to determine the type of change that has occurred as well as the location of the change. If the change only effects a portion of a file, the location of the change is identified as the base image and the incremental image (i.e., to restore the file both the base and incremental images are needed).

If a new file were added or a file deleted from the base image such that the incremental image file table indicates that the file is solely contained within the incremental image, no longer contained within the base image or the incremental image, that would be noted in the catalog.

The method 200 also analyzes whether the change is a significant change or a minor change. If the file table indicates that the change was only an attribute change such as a renaming of the file, a time-stamp change, or other minor changes that do not effect the data of the file, this type of change is noted as minor. The method 200 identifies the type of change by analyzing the file table record to see that a file has been changed but then finding that there has been no change to the data within the incremental image. As such, the file is identified as having a type of change that would be merely an attribute change, i.e., not a data change.

At step 210, the map is created containing the type of change and the location of change for each of the files that are contained within the incremental image. At step 212, the method 200 stores the map entries in the catalog. The map entries from the analysis of the base image are updated with the map entries from the incremental image. At step 214, the method 200 ends.

The method 200 creates the catalog 128 identifying the type of change and the location of change within the incremental file and the base file. This information is stored in the catalog that is accessible to a user to identify changes within information stored in a virtual volume. Thus, if a file is to be restored from the images, a user can quickly assess whether the restoration need only access and incremental image, a base image or base and incremental images. Since this catalog only reflects information that is stored within the virtual volume itself, the offset information and other information that is important to mapping to a serialized backup media, is not contained in the catalog 128. This information is added to the catalog when a backup catalog 140 as created as discussed below with respect to FIG. 3.

Figure 3:
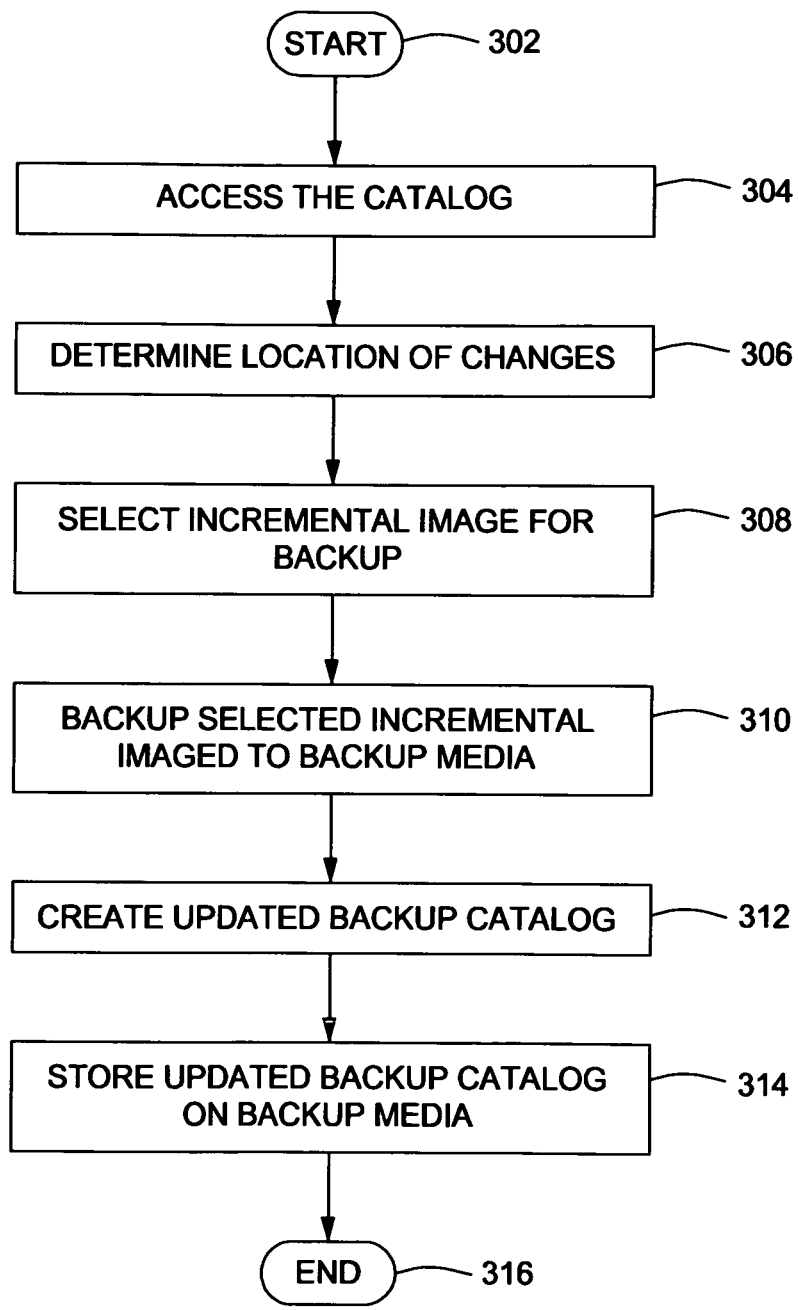
FIG. 3 depicts a flow diagram of a method for updating a backup catalog in accordance with one embodiment of the invention.

FIG. 3 depicts a flow diagram of a method 300 for creating a backup of a virtual volume in accordance with one embodiment of the invention. The method 300 assumes the base image has previously been backed up as a backup base image using conventional backup techniques. Method 300 is concerned with selecting appropriate incremental image(s) to back up and updating the backup catalog.

The method 300 begins at step 302 and proceeds to step 304, wherein the method 300 accesses the catalog 128. At step 306, the method 300 determines the location of changes that have occurred since the last backup. As described above, the information regarding the location of changes is contained in the catalog 128. The location of changes will identify whether the changes have occurred and within which specific incremental images those changes are stored.

At step 308, the method 300 selects at least one incremental image that contains the location of changes identified in step 306. The selected incremental image or images are identified for backup. At step 310, the method 300 backs up the selected incremental image to backup media. In one embodiment, this backup media is a serialized media such as a tape drive.

At step 312, the method 300 creates a updated backup catalog that will contain the offset information to identify where the selected incremental image has been stored on the serial media. At step 314, the method stores the updated backup catalog on the backup media, and the method 300 ends at step 316.

In this manner, the media contains a backup catalog that identifies the type of change and the location of the change as well as the offset to the incremental image containing the changes. As such, the backup catalog may be consulted upon restoration of a file to determine whether the base image and one or more incremental images is necessary to restore a particular file, or if just an incremental image or just a base image is necessary to restore a particular file. If only an incremental image or base image is required to restore a particular file, the restoration software can quickly access that particular incremental image using the backup catalog to identify the location of that image and extract the file from that image for restoration. This will substantially improves the speed at which files can be restored.

In one particular embodiment of the invention, the virtual volumes are supported by a MICRSOFT-based operating system, e.g., XP, VISTA and the like. In such an embodiment, the initially instantiated virtual volume is deemed a golden image that is used repetitively to create a plurality of virtual machines. This golden image forms the base image 120 of the virtual volume 116. Thereafter, any changes made by the user to the base image are stored as incremental image(s) 124 within the virtual volume 116. This is generally referred to as the differencing disk technique (that creates a differencing hard disk image) such that the base image always contains the golden image while the incremental changes are always contained in an incremental image. There may be a plurality of incremental images; however, a single base image may be used to instantiate a plurality of virtual machines. This base image need only be backed up once. In the case where the operating system is a Microsoft product, the file table is a master file table (MFT). In other embodiments, the file table may be a file attribute table (FAT), or in a Linux operating system the file table may contain INODES.

While the foregoing is directed to embodiments of the present invention, other and further embodiments of the invention may be devised without departing from the basic scope thereof, and the scope thereof is determined by the claims that follow.

What is claimed is:

1. A method comprising:
   inspecting an incremental image and at least one portion of a file table associated with the incremental image, where the incremental image is an incremental point in time copy of a virtual volume, wherein
   the file table is located within the incremental image,
   the virtual volume stores a virtual machine operating system, and
   the incremental image comprises information regarding one or more changes in at least one file with respect to a base image or another incremental image;
   determining, from the at least one portion of the file table, whether all of the portions of a first file are contained solely within the incremental image at a file location or whether the portions of the first file are distributed among the file location in the incremental image and one or more other images;
   storing information identifying the file location in a catalog; and
   if the determining indicates that the portions of the first file are distributed among the file location in the incremental image and one or more other images, locating the portions of the first file in the incremental image and the one or more other images and restoring the portions of the first file from the incremental image and the one or more other images, otherwise, restoring the all of the portions of the first file from the incremental image.

2. The method of claim 1 wherein the file table is a Master File Table, a File Attributes Table or inodes.

3. The method of claim 1 further comprising determining from the file table and the incremental image a type of file change associated with the first file, and storing the type of file change in the catalog.

4. The method of claim 3 wherein the type of file change comprises indicia that only a file attribute has changed and not data within the file.

5. The method of claim 1 further comprising:
   backing up the incremental image to a backup media; and
   updating a backup catalog with information from the catalog.

6. The method of claim 5 wherein the backup media is a tape backup media.

7. An apparatus comprising:
   a host computer executing virtual machine software to instantiate a plurality of virtual machines, wherein
   a first virtual machine comprises a virtual volume storing a copy of a virtual machine operating system,
   the host computer stores an incremental image and a file table associated with the incremental image,
   the file table is located within the incremental image,
   the incremental image is an incremental point in time copy of the virtual volume,
   the incremental image comprises information regarding changes in at least one file with respect to a base image or another incremental image,
   the host computer is configured to determine, from the file table, whether all of the portions of at least one file in the incremental image are contained solely within the incremental image at a file location or whether the portions of the at least one file are distributed between the file location in the incremental image and one or more other images, the host computer is configured to store information identifying the file location in a catalog, and if the host computer determines that the portions of the first file are distributed among the file location in the incremental image and one or more other images, the host computer is configured to locate the portions of the first file in the incremental image and the one or more other images and restore the portions of the first file from the incremental image and the one or more other images, otherwise, the host computer is configured to restore the all of the portions of the first file from the incremental image.

8. The apparatus of claim 7 wherein the file table is a Master File Table, a File Attributes Table or inodes.

9. The apparatus of claim 7 wherein the catalog comprises a type of file change associated with the at least one file.

10. The apparatus of claim 9 wherein the type of file change comprises indicia that only a file attribute has changed and not data within the file.

11. The apparatus of claim 7 further comprising:
backup software, executed by the host computer, for backing up the incremental image to a backup media and updating a backup catalog with information from the catalog.

12. The apparatus of claim 11 wherein the backup media is tape backup media.

* * * * *